US012625505B2

(12) United States Patent
Patel et al.

(10) Patent No.: US 12,625,505 B2
(45) Date of Patent: May 12, 2026

(54) REMOTELY DEPLOYED AND OPERATED DRONE-BASED SEALED TANK INSPECTIONS

(71) Applicant: Oceaneering International, Inc., Houston, TX (US)

(72) Inventors: Nikunj Patel, Katy, TX (US); Samao Silva, Houston, TX (US); Matthew Smith, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 65 days.

(21) Appl. No.: 18/770,942

(22) Filed: Jul. 12, 2024

(65) Prior Publication Data

US 2025/0044809 A1    Feb. 6, 2025

Related U.S. Application Data

(60) Provisional application No. 63/526,599, filed on Jul. 13, 2023.

(51) Int. Cl.
| | |
|---|---|
| *G01N 21/954* | (2006.01) |
| *G01N 21/88* | (2006.01) |
| *G01N 21/90* | (2006.01) |
| *G05D 1/224* | (2024.01) |
| *G05D 1/648* | (2024.01) |
| *H04N 7/18* | (2006.01) |

(Continued)

(52) U.S. Cl.
CPC ......... *G05D 1/648* (2024.01); *G01N 21/8851* (2013.01); *G01N 21/90* (2013.01); *G05D 1/224* (2024.01); *H04N 7/181* (2013.01);

*H04N 23/56* (2023.01); *H04N 23/66* (2023.01); *G05D 2105/89* (2024.01); *G05D 2107/50* (2024.01)

(58) Field of Classification Search
CPC .... G05D 1/648; G05D 2107/50; G05D 1/224; G05D 2105/89; G01N 21/954; G01N 21/8851; G01N 21/90; H04N 23/66; H04N 23/56; H04N 7/181; B64U 2101/30
See application file for complete search history.

(56) References Cited

U.S. PATENT DOCUMENTS

| | | | |
|---|---|---|---|
| 6,929,142 B2 * | 8/2005 | Gilbert | B65D 90/10 |
| | | | 220/826 |
| 12,319,369 B2 * | 6/2025 | Pryor | B62D 57/024 |

(Continued)

OTHER PUBLICATIONS

PCT/US24/37715—Written Opinion of the International Searching Authority; date of mailing Oct. 18, 2024, all pages. (Year: 2024).*

*Primary Examiner* — Helal A Algahaim
(74) *Attorney, Agent, or Firm* — Maze IP Law, P.C.

(57) ABSTRACT

A remotely deployed and operated drone-based sealed tank inspector comprises a direct replacement of normal hatch cover which is a sealed hatch cover comprising electrical penetrations, a sealing cable transit, and a predetermined set of eyelets for retention of lifting slings, and is handled using small hoist and parking stand. Drone-based inspections, including ultrasonic (UT) and visual inspections, may be remotely accomplished by deploying the remotely deployed and operated drone-based sealable tank inspector and using it for inspection and testing, including visual inspection, such as those required to be performed inside a sealed, inert-environment tank.

16 Claims, 3 Drawing Sheets

(51) Int. Cl.
 *H04N 23/56* (2023.01)
 *H04N 23/66* (2023.01)
 *G05D 105/80* (2024.01)
 *G05D 107/50* (2024.01)

(56) References Cited

U.S. PATENT DOCUMENTS

| | | | |
|---|---|---|---|
| 2002/0040783 A1* | 4/2002 | Zimmerman | E21B 47/001 |
| | | | 166/360 |
| 2007/0276552 A1* | 11/2007 | Rodocker | B62D 57/00 |
| | | | 701/2 |
| 2012/0055390 A1* | 3/2012 | Kalwa | B63G 8/001 |
| | | | 114/312 |
| 2018/0079476 A1* | 3/2018 | Abdellatif | B08B 9/023 |
| 2018/0089611 A1* | 3/2018 | Burch, V | B64U 50/19 |
| 2019/0287688 A1* | 9/2019 | Cole | G01N 9/10 |
| 2019/0325668 A1* | 10/2019 | Cole | G05D 1/0692 |
| 2021/0016333 A1* | 1/2021 | Belue | B08B 9/093 |
| 2022/0380009 A1* | 12/2022 | Abin | B63G 8/001 |

* cited by examiner

REMOTELY DEPLOYED AND OPERATED DRONE-BASED SEALED TANK INSPECTIONS

RELATION TO OTHER APPLICATIONS

This application claims priority through U.S. Provisional Application 63/526,599 filed on Jul. 17, 2023, incorporated herein by reference.

FIGURES

Various figures are included herein which illustrate aspects of embodiments of the disclosed inventions.

DETAILED DESCRIPTION OF VARIOUS EMBODIMENTS THE INVENTION

Figure 1:
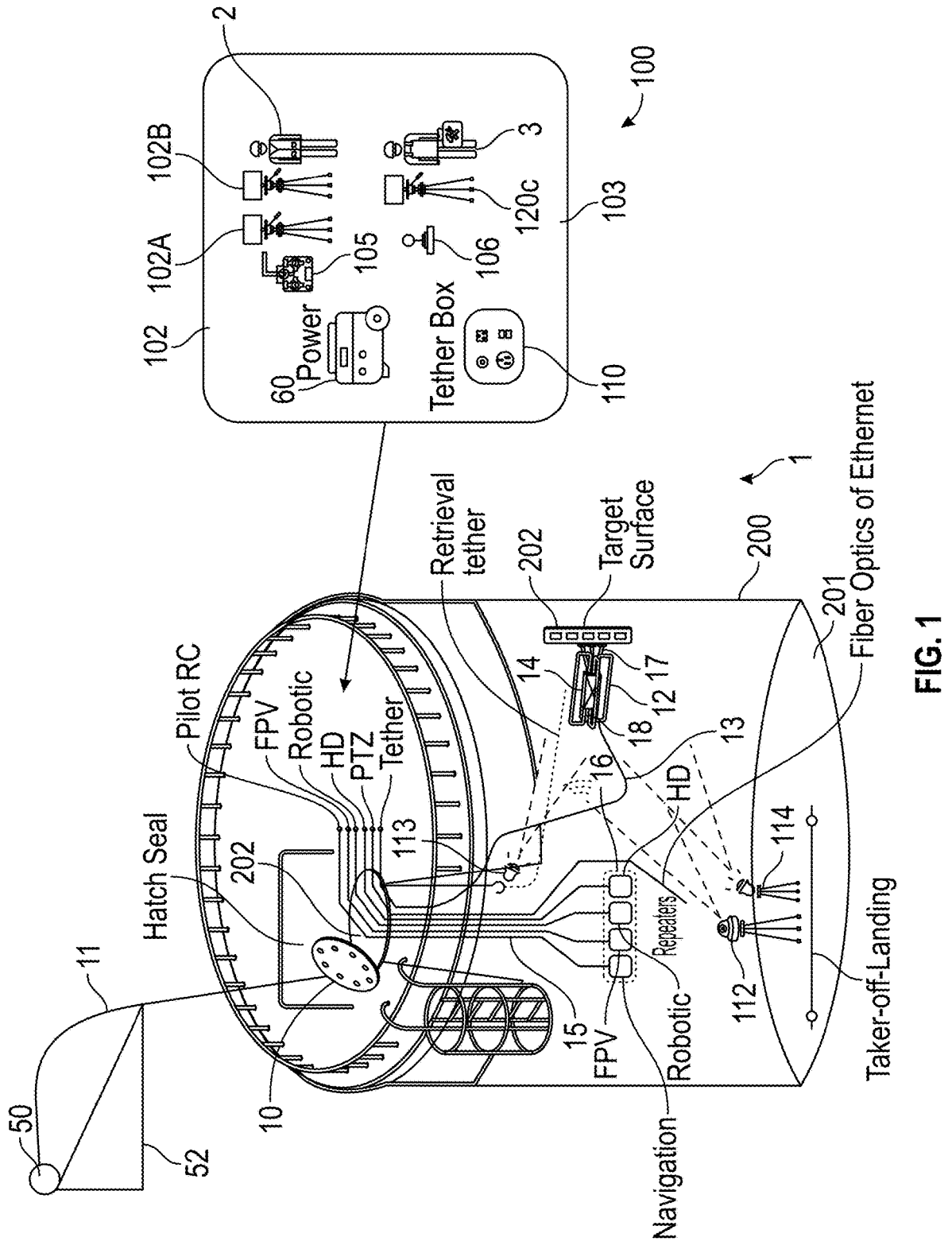
FIG. 1 is a block diagram in partial perspective of an exemplary system.
Figure 2:
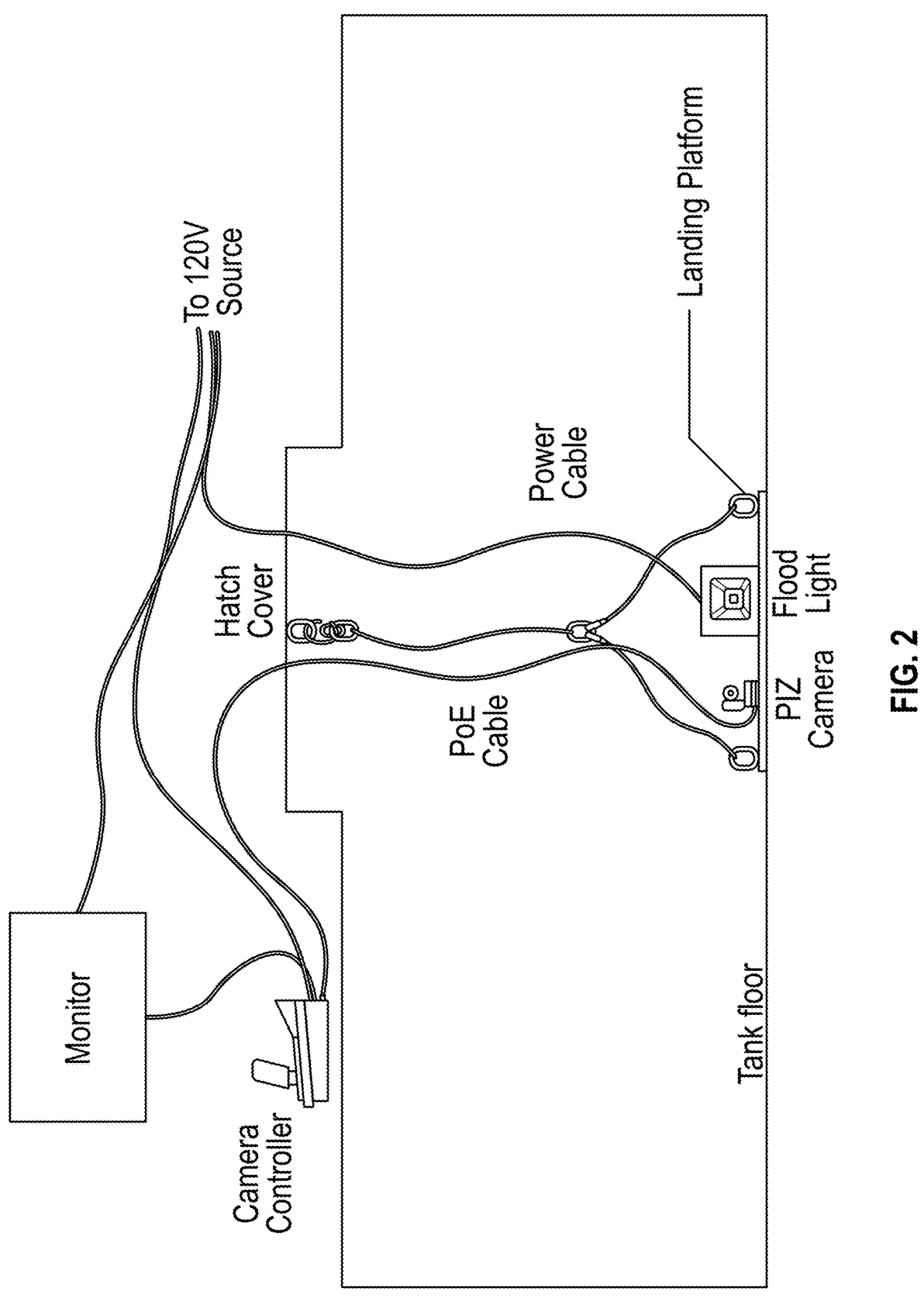
FIG. 2 is a block diagram of an exemplary system.

In a first embodiment, referring generally to FIG. 1, remotely deployed and operated drone-based sealable tank inspector 1 comprises sealed hatch cover 10, which operates as a direct replacement of a normal hatch cover, drone 12, and power supply 60, which may comprise an alternating current or a direct current power supply.

Figure 3:
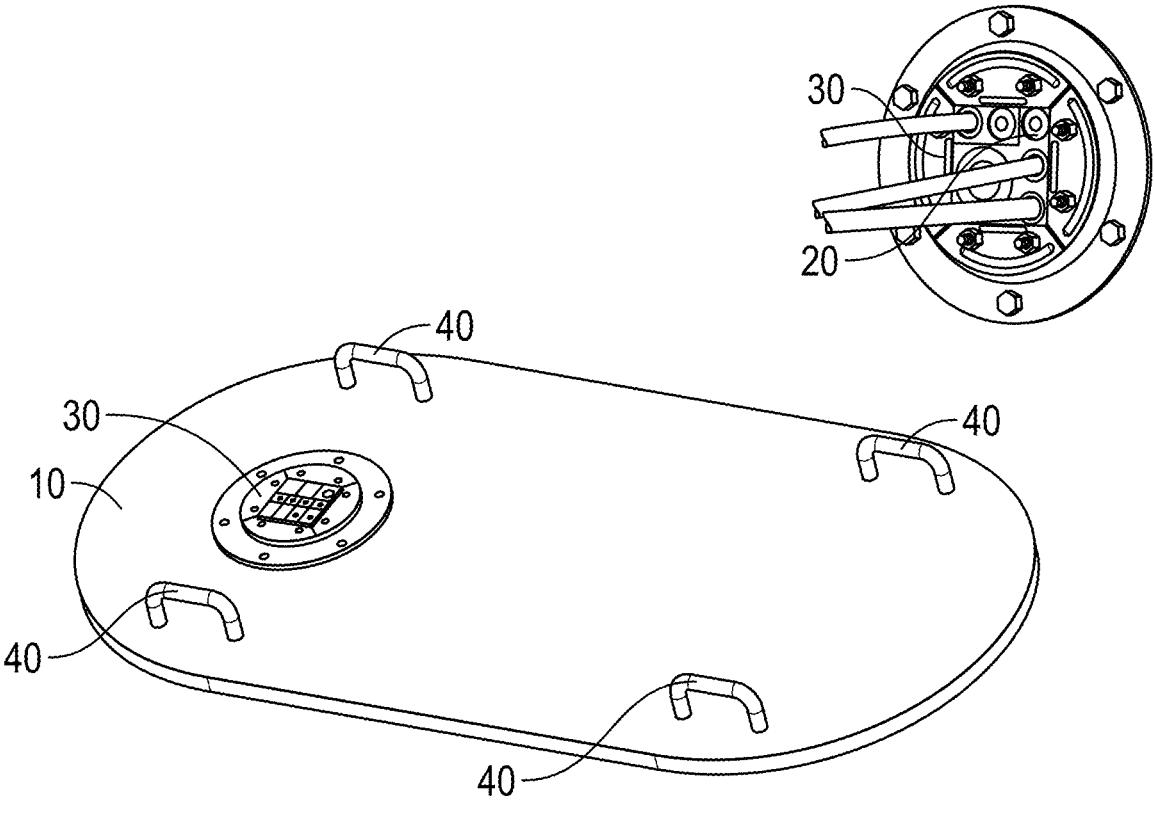
FIG. 3 is a view in partial perspective of an exemplary hatch cover.
Figure 3:
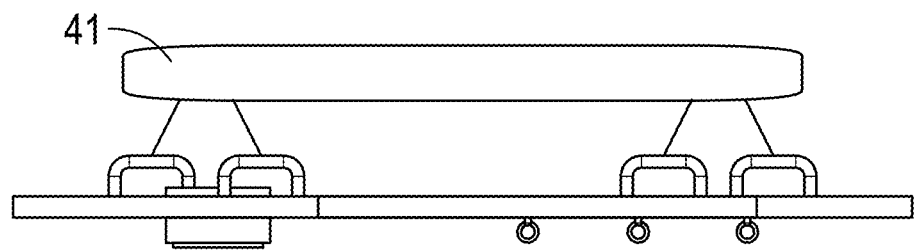

In typical embodiments, sealed hatch cover 10 comprises sealing cable transit 30, which further comprises a predetermined set of electrical ports 20 at least one of which is configured to accept one or more electrical conduits therethrough, and a predetermined set of eyelets 40 adapted to allow retention of one or more lifting slings 41 (FIG. 3). Typically, sealed hatch cover 10 is handled using hoist 50 and parking stand 52 using one or more hatch tethers 11 which may be operatively connected to either or both of the predetermined set of eyelets 40 or one or more lifting slings 41.

Drone 12 may be tethered such as by using drone tethers 13 or untethered and is typically configured to perform one or more tasks within sealable tank 200, which may be a sealed, inert-environment tank 200, comprising inspection tasks, testing tasks, and the like, or a combination thereof. Drone 12 typically comprises one or more data transceivers 14 and a predetermined set of inspection tools 17. Inspection tools 17 may comprise one or more pan-tilt-zoom ("PTZ") or first-per-view ("FPV") cameras, one or more ultrasonic test tools, or the like, or a combination thereof. Inspection tools 17 may be operatively connected to power supply 60, to drone power supply 18, or the like, or a combination thereof.

In embodiments, remote tether management system 110, remotely-deployed lighting 113,114, and one or more repeaters 16 for drone communications may be present with one or more of these adapted to be deployed within sealable tank 200.

If present, repeaters 16 are operatively in communication with drone transceiver 14 and may be deployed within and/or proximate to sealable tank 200.

One or more umbilicals 15 may be present and configured to provide power, one or more data pathways, or both to repeater 16. Accordingly, one or more umbilicals 15 may be operatively connected to power supply 60 which may be located proximate to remotely deployed and operated drone-based sealable tank inspector 1. In certain embodiments, one or more umbilicals 15 may comprise fiber optics, wired paths such as Ethernet compliant pathways, or the like, or a combination thereof, and used to provide power, one or more data pathways, or both to and from drone 12. In certain embodiments, data communication with drone 12 may be wireless and not need direct connection to umbilicals 15. In embodiments, remote tether management system 110 is operatively connected to umbilicals 15 and umbilicals 15 are disposed through at least one electrical port 20 of the predetermined set of electrical ports.

One or more interior cameras 112 may be present and may comprise pan-tilt-zoom (PTZ) or first-person-view (FPV) cameras. One or more of these interior cameras 112 may be deployed proximate to tank floor 201 and/or suspended within sealable tank 200.

In embodiments, predetermined components are typically disposed outside of sealable tank 200 proximate or within control station 100, by way of example and not limitation pilot station 102 for pilot 2 and inspector station 103 for inspector 3. Pilot 2 and inspector 3 may be the same person or separate people and pilot station 102 and inspector station 103 may be the same location or separate locations.

In embodiments, either or both of pilot station 102 and inspector station 103 may further comprise one or more PTZ monitors 102A which are operatively in communication with one or more PTZ cameras 17,112, one or more FPV monitors 102B which are operatively in communication with one or more FPV cameras 17,112, or the like, or a combination thereof. In embodiments, high definition (HD) monitor 102C may be present, typically at inspector station 103, and operatively in communication with one or more cameras 17,112, or the like, or a combination thereof.

Remote controller 105, for controlling drone 12, is typically present at pilot station 102 and inspection tool controller 106, typically comprising a PTZ controller, for controlling inspection tools 17 is typically present at inspector station 103. Remote control of drone 12 via remote controller 105 may be wireless or via drone tether 13.

One or more umbilicals 15 typically provide power and data pathways from pilot station 102 and inspector station 103 to components within sealable tank 200, e.g., drone 12, cameras 112, remotely-deployed lighting 113,114, repeater 16, or a combination thereof.

In the operation of exemplary methods, drone-based inspections, including ultrasonic (UT) and visual inspections, may be remotely accomplished by deploying a predetermined subset of components of remotely deployed and operated drone-based sealable tank inspector 1, which is as described above, to a location proximate sealable tank, which may already be disposed subsea, and using it for inspection, including visual inspection, and testing where such may include inspections and testing required to be performed inside sealable tank 200, including when sealable tank 200 comprises a sealed, inert-environment. In typical embodiments, the predetermined subset of components of remotely deployed and operated drone-based sealable tank inspector 1 comprise all components of remotely deployed and operated drone-based sealable tank inspector 1 but control station 100 or portions thereof.

In embodiments, remotely deployed and operated drone-based sealable tank inspector 1 may be piloted using first-person piloting such as by pilot 2, third-person tether-watching, wide area watching, and the like, or a combination thereof. Inspection tasks may be handled by pilot 2 and/or by inspector 3, third-person tether-controls, wide area controls, and the like, or a combination thereof.

Generally, operated drone-based sealable tank inspector 1, which is as described herein, is mobilized along with personnel, e.g., pilot 2 and/or inspector 3, to a deployment area, typically proximate sealable tank 200. In embodiments, a predetermined set of remotely deployed and operated drone-based sealable tank inspectors 1 is tested for proper functioning and communications prior to use.

One or more cameras 17,112 and lighting equipment 113,114 may be lowered into sealable tank 200, e.g., proximate or onto tank floor 201, or suspended within sealable tank 200 such as by using wire rope 53 which is then secured to the inside of sealed hatch cover 10. Drone 12 is inserted or otherwise lowered such as by tether 13 or flown in an untethered mode to a desired position within sealable tank 200, e.g., on or proximate tank floor 201. In embodiments using tether 13, tether 13 may be paid out onto tank floor 201 during the operation.

If present, one or more repeaters 16 may also lowered into sealed, inert-environment tank 200.

Hatch tether 11 is secured to hatch cover 10 and hatch cover 10 secured onto hatch opening 202 of sealed, inert-environment tank 200. Sealable tank 200 may then have an inert-environment created by filling sealable tank 200 with an inert atmosphere, typically after hatch cover 10 is sealed.

Once in place, a predetermined set of operations may then begin using inspection tools 17, e.g., visual inspections, ultrasonic testing, or the like, or a combination thereof.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A remotely deployed and operated drone-based sealable tank inspector, comprising:
   a) a hatch cover configured to seal a hatch opening of a sealable tank, comprising:
      i) a sealing cable transit comprising a predetermined set of electrical ports;
      ii) a predetermined set of eyelets for retention of a lifting sling; and
      iii) an umbilical disposed through at least one electrical port of the predetermined set of electrical ports and sealed by the sealing cable transit;
   b) a drone, configured to be deployed with the sealable tank, the drone comprising a predetermined set of inspection tools, the predetermined set of inspection tools comprising a drone camera; and
   c) a control station, comprising:
      i) a power supply operatively connected to the drone;
      ii) a data transceiver operatively in communication with the drone;
      iii) a pilot station operatively in communication with the drone; and
      iv) an inspection station, the inspection station comprising a controller operatively in communication with the drone and the predetermined set of inspection tools.

2. The remotely deployed and operated drone-based sealable tank inspector of claim 1, further comprising a remote tether management system operatively connected to the umbilical.

3. The remotely deployed and operated drone-based sealable tank inspector of claim 1, further comprising remotely-deployed lighting operatively in communication with the control station and configured to be deployed within the sealable tank.

4. The remotely deployed and operated drone-based sealable tank inspector of claim 1, further comprising a repeater operatively in communication with the data transceiver and the control station.

5. The remotely deployed and operated drone-based sealable tank inspector of claim 1, wherein:
   a) the control station further comprises a pilot station, comprising a monitor operatively in communication with one or more of cameras; and
   b) the controller further comprises:
      i) a remote controller operatively in communication with, and configured to control, the drone; and
      ii) an inspection tool controller configured to allow controlling the predetermined set of inspection tools; and
   c) the inspection station further comprises a monitor operatively in communication with the predetermined set of inspection tools.

6. The remotely deployed and operated drone-based sealable tank inspector of claim 5, wherein the umbilical is configured to provide power and data pathways from the pilot station and the inspection station to components within the sealable tank.

7. The remotely deployed and operated drone-based sealable tank inspector of claim 5, wherein the remote controller comprises a wireless drone controller or a wired drone controller.

8. The remotely deployed and operated drone-based sealable tank inspector of claim 1, wherein the remotely deployed and operated drone-based sealable tank inspector further comprises an interior camera.

9. The remotely deployed and operated drone-based sealable tank inspector of claim 8, wherein the drone camera and the interior camera comprise a pan-tilt-zoom (PTZ) camera or a first-person-view (FPV) camera.

10. The remotely deployed and operated drone-based sealable tank inspector of claim 1, wherein the hatch cover is further configured to be handled using a hoist and a parking stand, the remotely deployed and operated drone-based sealable tank inspector further comprising:
   a) an interior camera;
   b) remotely-deployed lighting;
   c) a wire rope operatively connected to the interior camera and the remotely-deployed lighting;
   d) a sling operatively connected to the predetermined set of eyelets; and
   e) a hatch tether operatively connected to the sling.

11. A method of performing drone-based inspection and test of a sealable tank using a remotely deployed and operated drone-based sealable tank inspector comprising a hatch cover configured to seal a hatch opening of a sealable tank where the hatch cover comprises a sealing cable transit comprising a predetermined set of electrical ports, a predetermined set of eyelets for retention of a lifting sling, and an umbilical disposed through at least one electrical port of the predetermined set of electrical ports and sealed by the sealing cable transit; a drone configured to be deployed with the sealable tank where the drone comprises a predetermined set of inspection tools that comprise a drone camera; and a control station that comprises a power supply operatively connected to the drone, a data transceiver operatively in communication with the drone, a pilot station operatively in communication with the drone, and an inspection station that comprises a controller operatively in communication with the drone and the predetermined set of inspection tools, the method comprising:

a) remotely deploying a predetermined subset of components of the remotely deployed and operated drone-based sealable tank inspector proximate to a sealable tank disposed subsea;

b) inserting the drone into the sealable tank;

c) securing a tether onto the hatch cover;

d) securing the hatch cover onto a hatch opening of the sealable tank;

e) creating an inert-environment within the sealable tank; and f) performing a predetermined set of operations inside the sealable tank using the predetermined set of inspection tools.

12. The method of claim 11, wherein the predetermined set of operations comprises a visual inspection.

13. The method of claim 11, wherein the predetermined set of operations comprises an ultrasonic test.

14. The method of claim 11, wherein the remotely deployed and operated drone-based sealable tank inspector is piloted using first-person piloting, third-person tether-watching, wide area watching, or a combination thereof.

15. The method of claim 11, wherein the hatch cover is further configured to be handled using a hoist and a parking stand, the method further comprising:

a) operatively connecting the hatch cover to the hoist; and b) lowering the hatch cover into position using the hoist.

16. The method of claim 11, wherein the predetermined subset of components of the remotely deployed and operated drone-based scalable tank inspector comprises all components of the remotely deployed and operated drone-based scalable tank inspector but the control station.

\* \* \* \* \*